United States Patent [19]

Fasano

[11] Patent Number: 5,597,236
[45] Date of Patent: Jan. 28, 1997

[54] HIGH/LOW VISCOSITY STATIC MIXER AND METHOD

[75] Inventor: Julian B. Fasano, Englewood, Ohio

[73] Assignee: Chemineer, Inc., Dayton, Ohio

[21] Appl. No.: 410,317

[22] Filed: Mar. 24, 1995

[51] Int. Cl.[6] .................................................. B01F 5/06
[52] U.S. Cl. ................................. 366/181.5; 366/338
[58] Field of Search ............................ 366/167.1, 173.1, 366/173.2, 174.1, 175.2, 181.5, 336–340; 48/189.4; 138/37, 40, 41, 42

[56] References Cited

U.S. PATENT DOCUMENTS

| | | | |
|---|---|---|---|
| 2,740,616 | 4/1956 | Walden . | |
| 2,747,844 | 5/1956 | Slayter | 366/181.5 X |
| 2,777,467 | 1/1957 | Powell et al. | 138/37 |
| 3,167,305 | 1/1965 | Backx et al. . | |
| 3,266,437 | 8/1966 | Blackmore et al. | 138/41 |
| 3,490,655 | 1/1970 | Ledgett | 222/196 |
| 4,043,539 | 8/1977 | Gilmer et al. | 366/340 |
| 4,408,892 | 10/1983 | Combes et al. | 366/337 |
| 4,441,823 | 4/1984 | Power | 366/181.5 X |
| 4,514,095 | 4/1985 | Ehrfeld et al. | 366/340 |
| 4,753,535 | 6/1988 | King | 366/337 |
| 4,793,713 | 12/1988 | King | 366/150 |
| 4,808,007 | 2/1989 | King | 366/337 |
| 5,176,448 | 1/1993 | King et al. | 366/339 X |
| 5,333,952 | 8/1994 | Perdue | 366/336 |
| 5,425,581 | 6/1995 | Palm | 366/339 |

FOREIGN PATENT DOCUMENTS

| | | | |
|---|---|---|---|
| 52-39861 | 3/1977 | Japan | 366/338 |
| 1408004 | 7/1988 | U.S.S.R. | 366/174.1 |

OTHER PUBLICATIONS

"Compounders: Impove High/Low Viscosity Mixing Efficiency," *Plastics Technology* Oct. 1984, pp. 18, 20 (Author Unknown).

King, L. T. "Additive Injection and Mixing Techniques." Killion Seminar, Mar. 1988, pp. 1–17.

Mutsakis, M. Koch Engineering Co. & F. A. Streiff and G. Schneider, Sulzer Brothers, Ltd. "Advances in Static Mixing Technology." *Chemical Engineering Progress* Jul. 1986, pp. 42–48.

King, Tony, Komax Systems, Inc. "Laminar Flow Injection Techniques for Static Mixers." Sep. 1982, 10 pgs.

King, Tony, Komax Systems, Inc. "Entrance Conditions: The Key to Mixer Performance." *Chemical Processing* Jul. 1994, pp. 61–62.

*Primary Examiner*—Charles E. Cooley
*Attorney, Agent, or Firm*—Biebel & French

[57] ABSTRACT

An in-line laminar flow motionless mixer mixes a low viscosity fluid into a high viscosity fluid. A first conduit section receives the high viscosity fluid and has a first set of slots. Injector nozzles extend into the first conduit section ahead of the slots with orifices which add the low viscosity fluid in the form of sheets. A second tubular section has a second series of slots formed orthogonally to the slots in the first section, and an annular connective jacket encloses the first and second set of slots and provides a flow path between the sections. A flow distributor extends within the respective and provides flow equalization. Method of mixing includes the injection of a low viscosity fluid as a striation. The composite flow is diverted circumferentially radially outwardly causing laminar shear mixing. The outward flow is cut into a smaller individual flows by slots, causing distributive and extensional mixing. The flows are recombined causing further distributive and laminar shear mixing. The combined flow is turned circumferentially radially inwardly and divided into smaller individual flows by a second plurality of slots, causing extensional and shear mixing to the composite flow, and the composite flow is recombined into an outflow.

15 Claims, 3 Drawing Sheets

HIGH/LOW VISCOSITY STATIC MIXER AND METHOD

BACKGROUND OF THE INVENTION

This invention relates to a motionless mixer for combining liquid components and to a particular apparatus and method which are particularly effective for the purpose of mixing a low viscosity liquid into a stream of high viscosity liquid.

It has become common practice to use motionless mixers for mixing or dispersing one liquid component into another under both laminar and turbulent flow conditions, and a large body of apparatii has been developed for this purpose. Many have their origins in the concepts invented by Armeniades et al, described in U.S. Pat. No. 3,286,992 issued Nov. 22, 1966 in which a left-hand and right-hand twisted series of axially aligned elements are in a tube. Another in-line mixing concept has self-nesting, abutting and axially overlapping elements, as shown in the patent of King, U.S. Pat. No. 3,923,288 issued Dec. 2, 1975.

A particularly difficult problem for in-line multiple element mixers is that of mixing flowable materials which have widely differing viscosities, a problem which is commonly encountered in the manufacture and/or mixing of polymers. Under laminar flow conditions the low viscosity material tends to tunnel or "snake" its way through and around the mixing elements without blending sufficiently with the high viscosity material.

In the operation of any laminar flow mixer, one or more mixing mechanisms may play a role. These include laminar shear mixing, elongation or extensional mixing, distributive mixing, and molecular diffusion mixing. Prior mixing devices tend to favor or rely upon certain of these mechanisms, to the exclusion of the others. For example, the dual viscosity mixer shown in King, U.S. Pat. No. 4,808,007 issued Feb. 28, 1989 relies primarily upon molecular diffusion, by inserting into the main stream flow a thin layer or striation of the low viscosity liquid, and thereafter moving the combined streams through a conventional static mixer. A disadvantage of this technique resides primarily upon the release of molecular diffusion to the exclusion of the other mixing techniques. Also, such a system suffers the disadvantage of high back pressure induced by the necessity for forcing the mixture through an elongated conventional static mixer in order to provide a sufficient residence time for diffusion to become effective.

SUMMARY OF THE INVENTION

This invention is directed to a motionless mixer apparatus and method which utilize laminar shear mixing, elongational mixing, distributive mixing, and molecular diffusion for improved mixing in a single unit. The low viscosity component is inserted or injected in the form of thin sheets or striations, into the axial flow of the high viscosity component in a tubular conduit. The combined axial flows are caused to turn from the center of the conduit radially outwardly through a pattern of slots or channels formed in the wall of the conduit. This movement from axial to radial flow through a series of slots causes strong distributive mixing. The movement of the combined flows through the slots or channels causes both extensional and laminar shear mixing.

The outlet ends of the slots open into an annular axially extending cavity, and the movement of the material into the annular cavity causes a further thinning of the striations and in the active recombining. By being redirected from radial to axial flow, within the annular cavity, further extensional and shear mixing occurs.

The partially mixed material in the annular cavity is again turned radially inward and is caused now to flow through a series of slots which are positioned orthogonally with respect to the first set or pattern of slots. This turning from axial to radial flow again causes distributive mixing, and movement through the slots creates additional shear and extensional mixing as well. Thereafter additional shear and extensional mixing occur as the material is caused to be turned from a radial direction back to an axial direction in a further tubular section of the mixer.

The preferred mixer apparatus of this invention is preferably divided into three sections, namely, a first conduit section having a first set of wall slots, an annular connective section, and a second conduit section having a second set of wall slots. First and second sections each contain a flow distributor therein in the form of a centrally positioned half-paraboloid or cone which has its apex, in the case of the first conduit section, positioned or pointed upstream and in the case of the second slotted conduit section, pointed downstream.

In a rudimentary manner, the flow distributor may be thought of as a pair of cones, one inverted with respect to the other, with their bases joined together and separating the two conduit sections at the common base. In practice, a solid surface of revolution resembling or approximating a parabolic curve or a paraboloid is preferred since the change in volume or the change in spacing defined between the circumferential or axial slots and the surface of flow diverter provides a condition of substantially uniform average velocities as the combined streams enter the first section and turn radially into the annular cavity section, and as these streams again turn radially inwardly for flow into the slots of the section and are caused to turn axially again before exiting the mixer of this invention.

A particular problem in mixing a low viscosity fluid with a very high viscosity fluid resides in the surface tension between the two fluids. These surface forces resist laminar shearing, laminar extension and flow division. A mixer which relies upon only one of these mixing mechanisms may not adequately overcome the surface tension forces involved under laminar flow conditions. As a result of the design of the mixer of this invention, the striation thicknesses of the injected material becomes substantially reduced, and in typical examples by a ratio of over 100 to 1, thereby enhancing molecular diffusion which becomes significantly effective where the striation thickness has been reduced to a very small amount.

The motionless mixer has high efficiency as compared to the conventional alternating left-hand/right-hand helical element mixer in the substantial increase in shear stress mixing, accompanied by a substantially lower pressure drop across the mixer. Further, the mixer design inherently can be scaled to different sizes, such as between a one-half inch diameter up to inlet diameters of 10 inches or more, while maintaining the mixing efficiency under laminar flow conditions.

It is accordingly an important object of this invention to provide a motionless mixer and method particularly adapted for mixing a low viscosity fluid into a high viscosity fluid under laminar conditions.

A further object of the invention is to provide a laminar flow mixer and process which combine laminar shear mixing, extensional mixing and distributive mixing to reduce the striation thickness and increase the striation density of the introduced low viscosity sheets and thus to provide for enhanced molecular diffusion.

A more particular object of the invention is the provision of a mixer, as outlined above, employing an injection system followed by an inlet section which converts axial flow into radial outflow, and having a first slot pattern for dividing the flow into a plurality of parts. An annular connection section receives this flow and recombines the radial flows into an axial flow. The connective section extends to a second slotted section, where the axial flow is converted into radial inward flow and divided by slots and is recombined in the second slotted section to an axial outflow. The mixer device at the first and second slot sections contains an internal flow distributor which provides for uniform flow velocities through the slots of the respective slotted sections.

A further object of the invention is the provision of a mixer device and method, as outlined above, in which the slots of the first slotted section are aligned orthogonally to the slots of the second slotted section.

A still further object of the invention is the provision of a mixer device and method, as outlined above, in which the flow distributors have a paraboloid shape.

Another object of the invention is the provision of a mixing device, as outlined above, in which the slots of the respective slotted sections provide a reduced cross-sectional area which is about from 20–80% of the cross sectional of the inlet or the outlet section.

A still further object of the invention is the provision of an injector design which provides inlet sheets of the low viscosity fluid within the high viscosity fluid comprising a plurality of diagonally extending injectors which may easily be withdrawn or removed through the wall of the tube for the purpose of maintenance and cleaning.

These and other objects and advantages of the invention will be apparent from the following description, the accompanying drawings and the appended claims.

Figure 1:
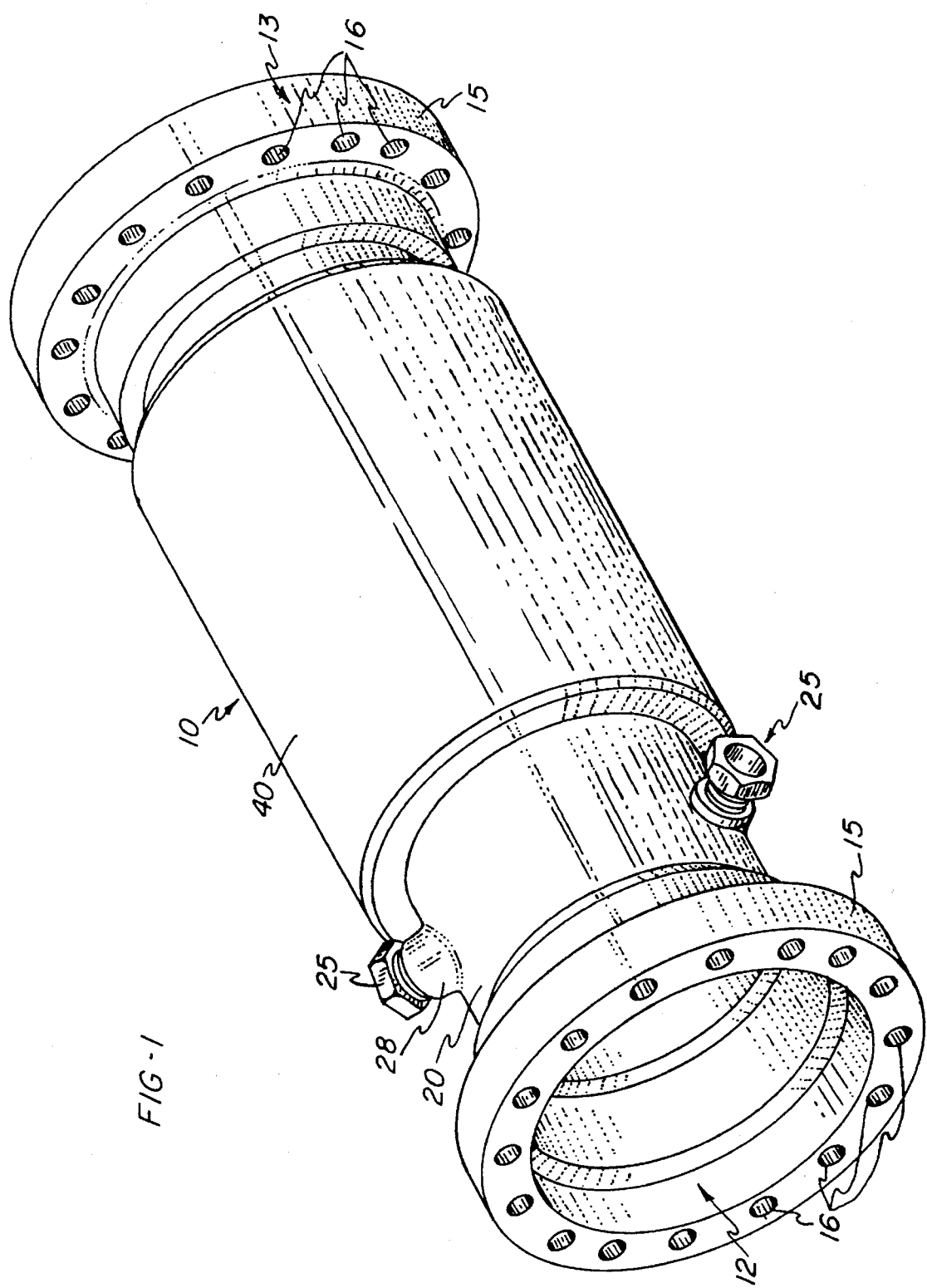
FIG. 1 is a perspective view of the mixer of this invention.
Figure 2:
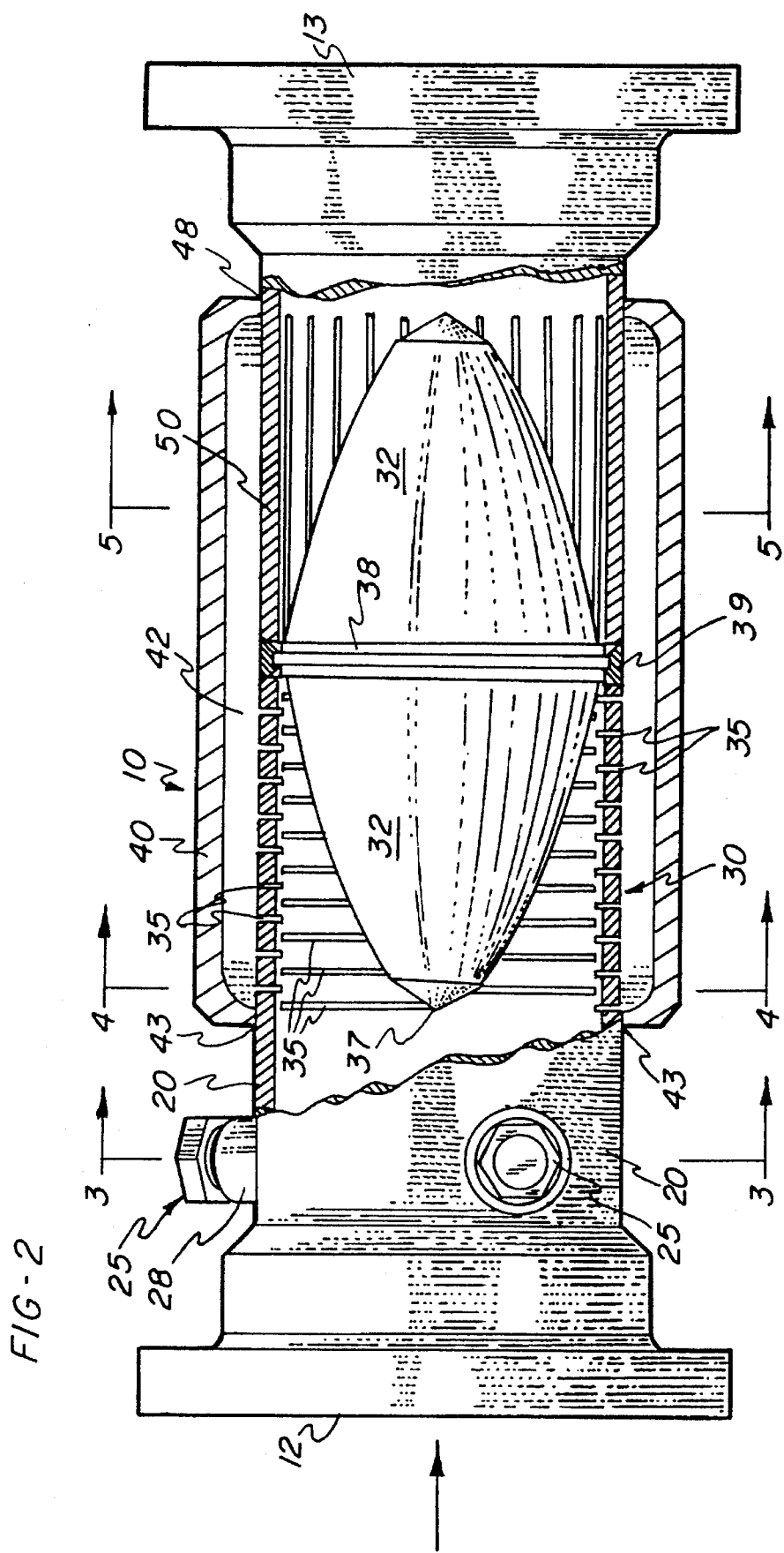
FIG. 2 is a side view in elevation, with a portion of the annular jacket side being broken away, to expose details of the interior.

Referring to the figures of the drawing, which illustrate a preferred embodiment of the invention, a motionless mixer in accordance with the invention is illustrated generally at 10 in FIGS. 1 and 2. The mixer 10 is formed with a flanged inlet end 12 and a flanged outlet end 13 by means of which the mixer 10 may be inserted in-line, in a conduit. Each of the flanged inlet and outlet ends is formed with a mounting flange 15 through which a circle of bolt holes 16 are formed for the purpose of mounting the mixer in-line in a suitable conduit.

The mixer 10 is particularly designed to mix, with relatively low back pressure or pressure loss, a low viscosity fluid into a moving stream of high viscosity fluid. In this case, a high viscosity fluid (fluid "A") may be defined as a fluid which is between about 5,000 to 5,000,000 times more viscous than the second fluid (fluid "B"). Fluid B may comprise as little as 1% or less of the total flow volume or, in some instances, may exceed 10% of the flow volume.

The mixer 10 is particularly adapted and intended for laminar flow mixing. Generally, flow through a pipe having a Reynolds number less than 10 may be considered to be in laminar flow, and Reynolds number which are less than one may be generalized as "creeping" laminar flow. Reynolds numbers may be very low, such as $10^{-4}$ or lower.

The higher viscosity fluid is applied to the device at the inlet 12 and it enters a tubular section of conduit or tubular pipe section 20 of a chosen diameter, preferably the same diameter as the flow conduit into which the mixer is inserted. The inside diameter of pipe section 20 may be as low as ½ inch or as great at 10 inches or more.

Figure 3:
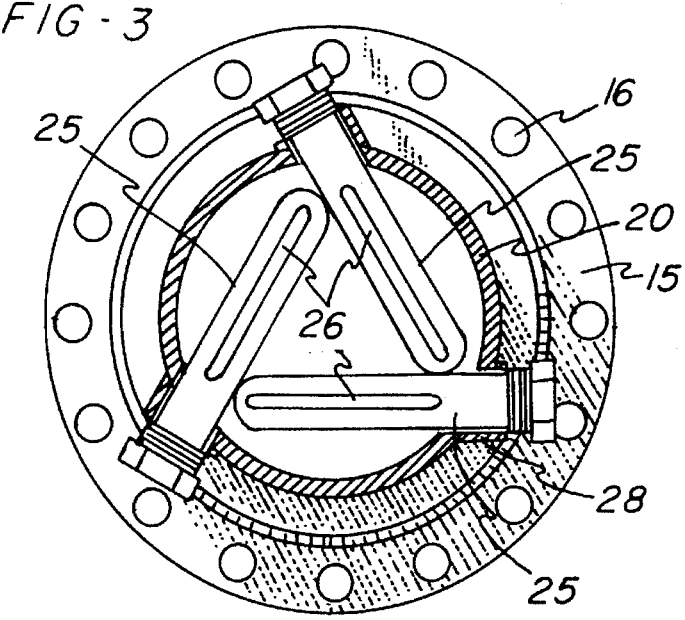
FIG. 3 is a section taken generally along the line 3—3 of FIG. 2.
Figure 4:
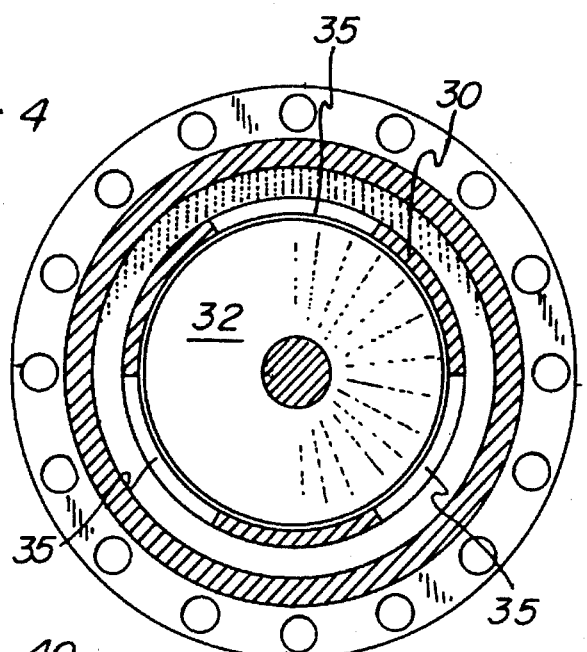
FIG. 4 is a sectional view looking generally along the line 4—4 of FIG. 2.
Figure 5:
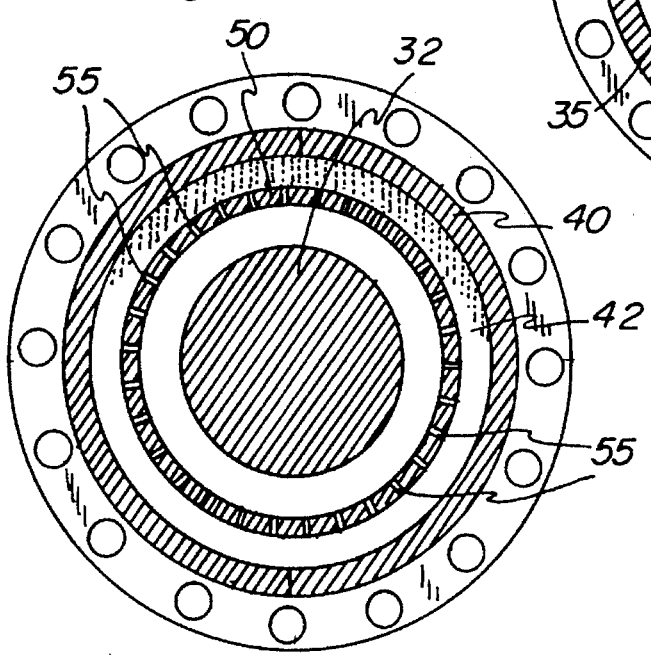
FIG. 5 is a further sectional view looking along the line 5—5 of FIG. 2.

The inlet section 20 defines a region and injector support in which the second more viscous fluid stream is injected into the mainstream flow. For this purpose, a plurality of partially transversely extending injectors 25 are provided to insert streams of the more viscous fluid to be mixed with the mainstream material. Injectors 25 are shown in FIG. 3 in the form of three closed-end injection nozzles each having a downstream facing straight line slot 26. The injectors 25 are flange or thread mounted on exterior bosses 28 or mating flanges by means of which they are removably supported within the conduit section 20.

The slots 26, in the arrangement shown in FIG. 3, define substantially an Isosceles triangle but one in which the corners of the triangle are open or not quite connected. That is, the slots 26 represent about 110° of a 120° segment. The slots 26 have, together, an open area which equals approximately the percentage of fluid B to be added to total of fluid A and fluid B, assuming a condition of isokinetic injection, that is, an injection rate at which the fluid B streams enter into the mainstream at approximately the same velocity at that of the mainstream fluid A.

Since the process of laminar mixing is, ultimately to provide small striation thicknesses and high striation densities at which molecular diffusion can more readily take place, it is preferable to add the viscous material B in a thin sheet form. Also, while the isosceles triangle injection arrangement is preferred, one or more radially transverse injector slots may be used with lower efficiency.

The injector nozzles 25 are preferably positioned in a common transverse plane, as shown in FIG. 3. However, instances where it is desirable to reduce the flow interruption to fluid A by the injectors 25, it may be desirable to stagger one or more of these injectors axially of the others to provide a higher degree of openness or to reduce the flow restriction in the first conduit section 20 caused by the bodies of the nozzles 25.

The inlet section leads immediately into a first slotted pipe section 30. The downstream end of the section 30 is closed or sealed by an inwardly extending flow divider or diverter 32 in the approximate shape of a solid doubled-ended paraboloid. The axis of the paraboloid is in line with the center axis of the section 30. The flow diverter 32 extends into the slotted section 30 so that it is coextensive with a series of staggered circumferential slots 35 formed through the wall of the slotted section 30.

While the actual slot pattern is not critical, it is preferred to have the slots 35 in staggered groups, and in which a first slot group extends in equally spaced 60° arcs laterally offset by a second such series of slots 35 similarly separated. The staggered slot pattern is chosen so as to maintain maximum strength in the wall of the first slotted section 30 by distributing stresses.

The flow diverter 32 has an outer surface which, in profile, forms or approximates a parabolic curve with its apex pointing upstream. The tip 37 is positioned axially at the location of the first of the slots 35, and the surface forms a progressively decreasing space between slots and the tube wall and provides for flow velocities within the section 30 which remain relatively constant, and the flows through the slots 35 are equalized.

The slotted section 30 may be considered as a first mixing section of the mixer 10, since it may be assumed that little mixing has taken place between the injectors 25 and the first if the slots 35. As the fluid approaches the tip 37, the maximum flow velocity (strain) is at the center of the pipe 20. However, as the flow continues to move past the tip of the diverter 32, the maximum velocity must necessarily shift from the center toward the wall of the section 30 as the flow sheets are caused to change direction by 90° with respect to the incoming flow, i.e., changing from axial flow to radial outflow. Substantial laminar or distributive shear takes place by reason of the movement of the regions of maximum strain from the center to the wall.

The slots 35 create further mixing using the distributive mixing mechanism in that the planes of the slots are oriented 90° to the planes of the injected sheets defined by the injection nozzle slots 26. Thus, if, as shown in FIG. 2, there are 60° segments making up, effectively, 20 circumferential slots, then by distributive division, the flow will be effectively divided into 20 thinner sheets. Compare this to a conventional static mixer which uses twist elements each of which divide the stream in half. Such a mixer would require 20 elements to produce the same distributive mixing effect.

The entire mass flow of the fluid within the pipe section 20 now is divided by the number of circumferential slots 35 and flows radially and circumferentially outwardly through the slots. The total slot area in section 30 is less than the maximum cross-sectional area of the section 20 preferably by about 50% but the range of areas may be from about 20% to about 80% of the cross-sectional area of the section 20. At the transverse slots 35, the flow must divide and neck down in passing through the slots and when this happens, it causes the sheets defined by or comprising fluid B to thin out. Thus, if the slot area is one-half of the main cross-sectional area, then the sheets representing fluid B will thin down by a factor of 2. This thinning down or extensional elongation accompanied by fluid acceleration in the slots, produces reduced striation thicknesses and improves the rate and completeness of mixing.

The slots 35 open into a common annular axially extending chamber 42 defined by an enclosing and encircling jacket 40. A jacket 40, at the upstream end, is turned inwardly and welded at 43 to an outer surface of the section 32 at a location upstream of the first of the slots 35. The annular flow area defined between the inside surface of the jacket 40 and the outside surface of the section 30 is preferably approximately equal to one-half the inside area of the inlet section 20. The separate streams through the slots 35 recombine in the annulus 42 defined by the jacket 40 and move axially at substantially twice the rate of movement as the material in section 20.

As the composite of materials exit the circumferential slots into the chamber 42, the flow through the slots must expand to fill the entire annular chamber 42. Where the annular chamber 42 has a flow area equal to that of the slots 35, this has a further tendency to thin the sheets or striations by a factor of 2. In addition, the striations are now in strong laminar shear by reason of the change of flow direction through 90° and undergo additional laminar shear as the fluids recombine and flow axially within the cavity of annulus 42.

The downstream end of the jacket 40 is joined to and welded at 48 to the outer surface of a second slotted section 50. Thus, the annular cavity defined by the jacket 40 bridges and encompasses the slots in the sections 30 and 50. The slotted section 50 has the same diameter as that of the sections 20 and 30, and the upstream end of the section 50 is joined to and closed at the flow diverter 32 at the base 38, such as by welds 39.

The section 50 within the confines of the jacket 40, is provided with a plurality of axially oriented slots 55, and extends beyond the slots to the outlet 13. It will be seen that the slots 55 are in orthogonal relation to the slots 35, and, similar to the slots 35, the slots 55 preferably represent about 50% of the cross-sectional area of the inside diameter of the section 50 but may have a range of about 20 to 80% of the cross-sectional area.

The flow sheets which exist in the annulus or chamber 42 tend to be concentric to the center line of the axis of the mixer. Thus, these sheets are placed into strong laminar shear again by changing flow direction through 90° to a circumferential radial inflow in entering the axial slots 55 and in exiting the slots. If, for example, there are 28 axial slots, then there are 7½ axial slots for each original sheet formed by the slots 26. Assuming 20 slots 35 and 28 axial slots 55, then the flow will have been divided 168 times. Also, the sheets undergo additional laminar shear transitioning the annulus section overlying the second slot section 50 to the slots 55.

As previously described, the flow divider 32 is effectively double-ended, that is a duplicate of the flow divider extends into the second slotted section 50 with an overall height of the paraboloid substantially equal to the axial length or extent of the slots 55, preferably with a surface configuration the same as that within the section 30 and with its apex point downstream. Thus, as the fluid moves downstream, the maximum strain is at first near the wall of the section 50, and as the flow moves toward the tip of the divider 32, the position of maximum strain moves from the wall to a region nearer the center of the passageway. The surface configuration of the flow divider permits the velocities in this section to remain substantially constant.

In some instances, it may be satisfactory to use a double-ended cone or an ellipsoid as a flow divider in place of the preferred parabolic surface of revolution. Such a double-ended cone or ellipsoid would also perform as a flow divider but would not provide for the same uniform flow rate characteristics as does the preferred parabolic shape.

The method of the invention includes the injection, into the mainstream flow of higher viscosity material, of one or more sheets or thin striations of the more viscous material causing this combined flow to undergo a change from axial to radial outflow, causing the material to be divided in flow through a series of circumferential slots having an area less than that of the main flow, causing the material to be recombined and turned again into an axial direction, causing the material to be divided a second time by turning from axial to radial inflow through a second series of slots, which second series also has a flow area less than that of the main flow area, and reorienting the flow again to axial.

The efficiency or degree of effectiveness of the invention may be understood by considering the ratio of the coefficient of variation (CoV) which may be defined as the ratio of a standard deviation over the mean. Thus, if one were to simultaneously pull a statistically significant number of samples from the cross-section of a pipe and analyze each sample for the concentration of fluid B to fluid A, as previously defined, one could determine the mean as well as the standard deviation for such samples. The ratio of standard deviation to mean represents the degree of mixedness across a section of pipe, which is represented as CoV.

The coefficient of variation CoV will change depending upon the percentage of fluid B added to fluid A. Obviously, the easiest mix to blend is 50% A and 50% B, and as the percentage of B becomes lower, it becomes more difficult to blend the material to achieve the same degree of mixing.

The feed of fluid A may be visualized as having an initial coefficient of variation $CoV_o$ depending upon the volume of material to be added, and may be express as follows:

$$CoV_o = \sqrt{\frac{1-V_b}{V_b}}$$

where
$V_b$=Volume fraction of fluid B which is added.

The degree of mixedness may be represented by normalizing the coefficient of variation as follows:

$CoV/CoV_o$

The degree of mixing at any defined downstream location may be determined experimentally by simultaneously sampling at a statistically significant number of points at the cross-section. Computationally, the degree of mixing at any downstream location may be calculated using commercially available software, such as Fluent 4.0, designed to solve basic flow conservation equations which include conservation of mass, momentum, energy and species. Such software, under known and predictable laminar flow conditions, provide numerical outputs and graphic visualizations of the species uniformity (degree of mixing), and the flow vector for any one of a high number of small select volumes, as these volumes move through the mixing device.

Using known computational fluid dynamics techniques, the normalized ratio for the mixer in accordance with the teachings of this invention, assuming completely miscible fluids, with no appreciable surface tension, is $CoV/CoV_o$= 0.0155.

Thus, a mixer according this invention, in which 5% of fluid B is added to fluid A, will have a calculated CoV of:

$CoV = 0.0155\ COV_o$ $CoV_o = \sqrt{\frac{1-0.05}{0.05}} = 4.36$ $CoV = 0.0155 \times 4.36 = 0.0676$ As an example, a 3.0 inch mixer may have the following characteristics. The inside pipe diameter would conform to a nominal pipe of schedule 40, presenting an inside diameter of 3.068 inches and an outside diameter of 3.5 inches. To provide a 5% addition of fluid B, three injectors may have slots which are 2.19 inches long and would have a combined outlet area which represents 5% of the cross-sectional area. There are eighteen circumferential slots 35 each having an inside circumferential length of 1.61 inches with a circumferential spacing between slots of 1.61 inches, an axial spacing of 0.589 inch, and the ratio of the total slot 35 area to cross-sectional area of the inlet section would be about 0.49.

Ten axial slots 55 may be used, each with a slot width of 0.125 inch and a length of 3.7 inches, thereby providing a ratio of axial slot area to pipe cross-sectional area of about 0.52. Such a mixer, as described, has an insertion length, including the injectors, of about 10 inches.

The mixer of this invention cannot be compared directly with the conventional reverse helical element mixer of the kind constructed in accordance with the Armeniades et al patent since the later device is ineffective in mixing very low viscosity fluids into very high viscosity fluids. However, a comparison of the relative mixing abilities may be made by assuming that fluid B has about the same viscosity as fluid A, for example, 100,000 cp and assuming a ratio of 95% fluid A, 5% fluid B, to provide the same degree of mixing, the twist element mixer would require about eighteen elements, and at a nominal 3.0 inch diameter, requires an insertion length of about 86 inches and results in a pressure drop of about 120 psi at a flow rate of 10 gallons per minute. Under the same conditions, the mixer according to this invention has an insertion length of about 10 inches, as mentioned above, and has a pressure drop of about 42 psi.

The mixer of this invention is particularly adapted for scaling to different sizes, which is not true of many mixer designs, and particularly is not true of mixers which rely only upon one or two mixing mechanisms to the exclusion of the others. In scaling, it is preferred to make the number of circumferential slots and axial slots proportional to the diameter of the pipe at the inlet or outlet, in order to maintain a constant number of slot divisions with respect to area. By making the number of slots proportional to the diameter of the pipe, sheet thicknesses and the spacing between individual sheets remain constant, which translates into a uniform degree of diffusional mixing regardless of size. Thus, in the example given, a 3.0 inch mixer may have eighteen circumferential slots while a 10.0 inch mixer may have sixty slots, and a similar ratio should be maintained for the axial slots 55.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An in-line laminar flow mixer for mixing a second fluid into the mainstream flow of a first fluid, comprising:

a first tubular section having an inlet which may be connected to receive therein said mainstream flow, an injection nozzle extending into said first tubular section and having an outlet slot for admitting a striation of said second fluid into said mainstream flow to form a composite flow, a first series of slots formed in said first tubular section downstream from said nozzle, means closing said first tubular section at a position downstream from said slots whereby said composite flow is caused to turn radially outwardly through said first series of slots, a second tubular section positioned in general axial alignment with said first tubular section, a second series of slots formed in said second tubular section, means closing said second tubular section at a position upstream from said second series of slots, said second tubular section having an outlet positioned downstream of said second series of slots, a circumferential jacket surrounding said sections and closed at one end at said first tubular section at a position upstream of said first series of slots and closed at an opposite end at said second tubular section at a position downstream of said second series of slots and defining with said first and second section an axial flow path encompassing said first and second series of slots whereby flow from said first section through said first series of slots is directed by said jacket to said second series of slots into said second section.

2. The mixer of claim 1 further comprising a flow diverter in said first tubular section positioned to intercept said composite flow therein and to direct said flow into said first series of slots with a substantially uniform velocity.

3. The mixer of claim 2 in which said flow diverter is a parabaloid with its axis positioned centrally of said first tubular section and having its apex facing upstream toward said inlet.

4. The mixer of claim 2 further comprising a second flow diverter in said second tubular section positioned to intercept said composite flow therein from said second series of slots and to direct said flow to said outlet.

5. The mixer of claim 4 in which said second flow diverter is a paraboloid with its axis positioned centrally of said second tubular section and having its apex facing downstream toward said outlet.

6. The mixer of claim 2 in which said jacket defines a flow space which in area is approximately one-half that of the cross-sectional area of said first tubular section.

7. The mixer of claim 1 in which said tubular sections are cylindrical and positioned on a common axis and in which said first series of slots are oriented transverse to said axis and said second series of slots are oriented parallel to said axis.

8. The mixer of claim 1 in which the cross-sectional areas defined by each said first and second series of slots are between about 20–80% of the cross-sectional area of said first tubular section.

9. An in-line laminar flow mixer for mixing a low viscosity fluid into a high viscosity fluid, comprising:

a first tubular conduit section having an inlet end for receiving such high viscosity fluid component and further having a first set of slots in a wall thereof spaced from said inlet, at least one injection nozzle extending through the wall of said first conduit section between said inlet end and said first set of slots, said nozzle having a downstream oriented slot therein for admitting said low viscosity fluid into the stream of said high viscosity fluid and forming a sheet of said low viscosity fluid therein, a second tubular conduit section axially aligned with said first tubular conduit section, and having in the wall thereof a second set of slots, the slots in said second set of slots being orthogonally related to the slots in said first conduit section, an external annular connective jacket closed at one end on an exterior surface of the wall of said first tubular conduit section and closed at the opposite end on an exterior surface of the wall of said second tubular conduit section, and encompassing therein said first and second slot sets, a flow distributor substantially in the form of a double-ended paraboloid having its axis aligned with the axis of said tubular conduit sections and having its base positioned axially between said first and second conduit sections and forming a closure between said conduit sections, with one of the paraboloids extending in the upstream direction into said first conduit section, and with the other paraboloid extending downstream into said second conduit section, with the surfaces of said paraboloid defining a flow divider for each of said conduit sections, said first and second sets of slots each having an area approximately 20–80% of the area of said tubular conduit sections, and said connective jacket having an annular flow area with said tubular conduit sections approximately equal to one-half the internal flow area of said tubular conduit sections.

10. A method of mixing a low viscosity liquid into a mainstream flow of higher viscosity liquid flowing in a tube in a generally straight-line path, comprising the steps of:

injecting said low viscosity liquid as a striation into said mainstream flow and at a velocity that is substantially the same as the velocity of said higher viscosity liquid thereby forming a composite flow thereby forming a radially outward flow, causing said composite flow to be diverted circumferentially radially outwardly from said path thereby causing laminar shear mixing of said composite flow, cutting said radially outward flow into a first plurality of smaller individual flows through a first plurality of slots formed in the wall of such tube thereby causing distributive and extensional mixing of said flow in said slots, combining the flows exiting said first plurality of slots and forming a combined flow moving in a direction parallel to said straight-line path thereby causing further distributing and laminar shear mixing of said combined flow, causing said combined flow to be turned circumferentially radially inwardly effecting further laminar shear mixing and forming an inwardly turned flow, dividing said inwardly-turned flow into a second plurality of smaller individual flows through a second plurality of slots thereby causing further extensional and shear mixing to said composite flow, and further combining said second plurality of individual flows though said second plurality of slots and causing said further combined flow to be turned in a direction along said straight-line path thereby effecting further laminar shear mixing.

11. The method of claim 10 in which said injecting step includes the injection of said lower viscosity liquid in the form of a plurality of individual non-parallel thin sheets of said lower viscosity liquid.

12. The method of claim 11 in which said injecting step forms said sheets in the shape of an isosceles triangle.

13. The method of claim 10 in which the circumferentially radially outward flow is formed between said first plurality of slots and the surface of a solid paraboloid having its axis positioned on the axis of said straight-line flow path and with its apex facing upstream of said flow path.

14. The method of claim 13 in which the circumferentially radially inward flow out of said second plurality of slots is directed between said second plurality of slots and the surface of a second solid paraboloid having its axis positioned on the axis of said straight-line path and having its apex facing downstream of said flow path.

15. The method of claim 10 in which the step of combining the flows exiting said first plurality of slots includes the step of causing said combined flow to move at a velocity which is about twice the flow velocity of said higher viscosity liquid in said straight-line path.

* * * * *